Sept. 6, 1966     J. M. DODWELL     3,270,845
BAND CLUTCH
Filed July 9, 1964
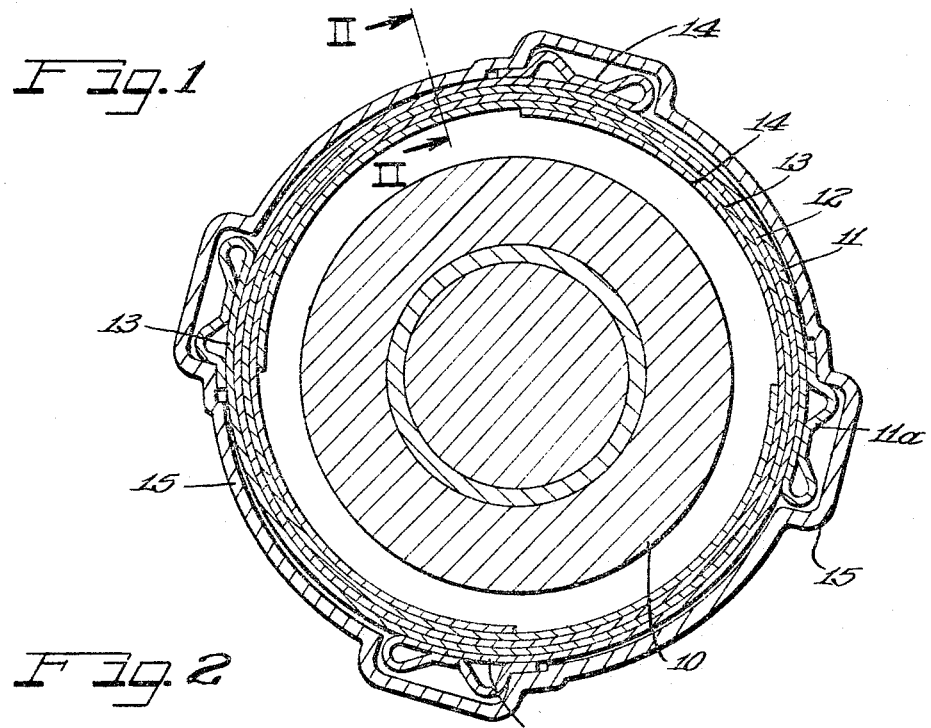
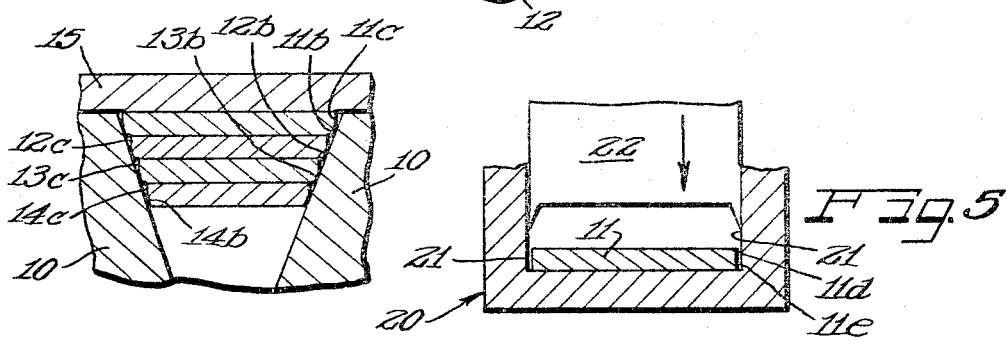
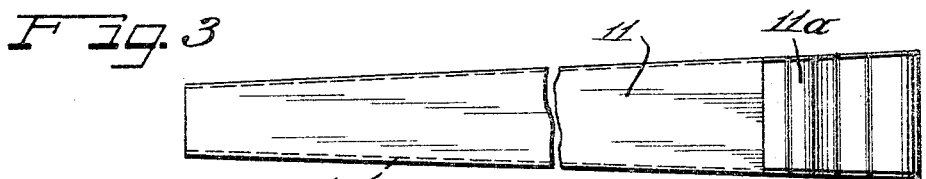
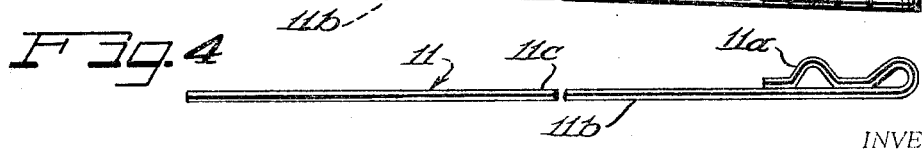
INVENTOR.
John M. Dodwell
ATTORNEYS United States Patent Office 3,270,845
Patented Sept. 6, 1966

3,270,845
BAND CLUTCH
John Major Dodwell, Piedmont, Quebec, Canada
(2619 N. 5th St., Niles, Mich.)
Filed July 9, 1964, Ser. No. 381,447
6 Claims. (Cl. 192—81)

The present invention relates to improvements in the art of free-wheeling overrunning clutches and is, more particularly, concerned with the provision of an improved clutch construction of the overlapping torque-transmitting band friction clutch of the type illustrated in my recent United States Letters Patents Nos. 2,917,144 and 3,012,637.

More particularly, the present invention is concerned with the provision of a clutch employing flexible bands operating in a V-groove in such a manner as to transmit torque between clutching members with the bands acting in a wedging action in the V-groove. Utilizing this band wedging action, the clutch of my prior devices, and of the present construction, provides one-way relative rotation between clutching members.

As in my prior clutch type devices, it will be observed that in situations in which one of the relatively rotatable members is fixed, the device may be termed a one-way brake. On the other hand, when both relatively rotatable components are capable of rotation, the device may more properly be termed a clutch. However, it is my intent that the device be interchangeably used in these fields and to avoid confusion, the device is termed a clutch to reflect its control of relative movement, and the term is considered generic as thus used.

Considerable life testing of band clutches of the type set forth in my earlier patents has shown their ability to withstand repeated clutching or braking with very little change in performance characteristics over their useful life. However, it has been found that the clutches of this type are capable of satisfactory operation for many hundreds of thousands of clutchings beyond the useful life of previously used one-way clutches, without band failure. In such extended life testings and utilizations, a condition of wear has arisen by which the efficient operation of the clutch has been interrupted. Suddenly, and for no apparent reason, a clutch will, after many hundreds of thousands of clutching cycles, be found to slip in the normally clutched condition of movement. It has been found in such cases that mere disassembly and reassembly of the parts will rejuvenate the clutch device but careful examination of the disassembled parts has shown that the cause of the problem lies in a wear condition at the band edges by which the multiplicity of bands used assume a perfectly smooth continuous surface from band to band in the radial direction. In other words, all of the bands wear to a condition in which the cross-section of the bands in use comprises a trapezoid with no appreciable space between bands and no edge clearance between the radially outermost surface of one band and the radially innermost surface of the next or outwardly positioned band.

After many experiments, it has been determined that this cause of difficulty, brought on by the exceptionally long life of the bands, and their ability to withstand breakage, is completely eliminated by initially constructing the bands with a coined, or otherwise constructed, side edge providing a bevel equal to the angle of bevel of the clutch pulleys over only a portion of the radial dimension of the band. Thus, radial lines drawn from the axis of a clutch rotation along the innermost portion of the band edges would constitute a V while similar radial lines passing along the edges of the band from slightly beyond its midpoint to its outermost surface would be substantially parallel. This provides a combination rectangular and trapezoidal cross-section for each clutch band and provides a relieved area between adjacent bands preventing a unitization of the bands in assembly. It has been found that this band configuration has completely eliminated the problem of long term band ineffectiveness.

It has been found particularly desirable to provide this band configuration at the time of original manufacture of the band since at that time the curvature of the bands is established permanently. Although in some instances, reshaping of worn bands will accomplish an elimination of the ineffectiveness of band operation, such correction would be at the expense of permitting the bands to sink deeper in the clutching pulley with less spring tension in the bands and a resulting reduction in torque response upon change of direction.

It is, accordingly, an object of the present invention to provide an improved band for utilization in multi-band friction clutches.

Another object of the present invention is to provide an improved method of manufacturing a clutch band.

Still a further object of the invention is to provide an improved clutch band for utilization in an overlapping-band clutch combination.

A feature of the invention is the provision of a partial bevel on the wedging edges of the individual clutch band whereby radially spaced wedging surfaces are provided.

Still another object of the present invention is the provision of an overlapping-band type one-way clutch capable of substantially indefinite service life without decrease in effectiveness.

Still other and further objects and features of the present invention will at once become apparent from a consideration of the attached drawings wherein embodiments of the invention are shown by way of illustration only, and wherein:

FIGURE 1 is a cross-sectional view of an overlapping-band type friction clutch embodying the principles of the present invention.

FIGURE 2 is a partial cross-sectional view taken along the line II—II of FIGURE 1.

FIGURE 3 is a plan view of a typical clutch band immediately prior to curling into its final form.

FIGURE 4 is a side-elevational view of the clutch band illustrated in FIGURE 3;

FIGURE 5 is a cross-sectional view of a coining die suitable for the manufacture of bands in accordance with the principles of the present invention; and FIGURE 6 is a cross-sectional view of a modified form of band.

As shown on the drawings:

As may be seen from a consideration of the drawings, the clutch illustrated comprises a band clutch of the overlapping-band type similar in over-all configuration to those illustrated in my above-mentioned prior patents. In such an arrangement, a pulley 10 seats a plurality of bands 11, 12, 13 and 14 which are keyed by their respective key portions, such as 11a to an outer housing member. In this arrangement, rotation of the pulley member 10 in the counterclockwise direction as viewed in FIGURE 1, is prevented, while rotation of the member 10 in the clockwise direction relative to the housing 15 is readily permitted by slight expansion action of the bands.

The operation of the clutch, as above described, is conventional at this date. However, as above pointed out, it has been found in practice that after many hundreds of thousands of cycles of operation, clutches in which the bands are initially beveled to match the pulley sidewalls have a tendency to become ineffective in their wedging operation. This may result from a very slight band metal accumulation at the edges of the bands between adjacent bands which prevents complete seating of all of the bands simultaneously. It has been found that elimination of any possibility of such a build-up by means of providing an initial partial bevel with a relief at the radially outermost portion of the band edge has prevented such difficulties. Accordingly, as may be clearly seen from a consideration of FIGURE 2, each of the individual bands 11, 12, 13 and 14, is provided with an initial bevel, respectively indicated at 11b, 12b, 13b and 14b. The radially outermost portion respectively 11c, 12c, 13c and 14c comprises a generally parallel wall condition, as viewed in FIGURE 2. The parallel wall configuration is readily manufactured and is the preferred embodiment. However, it will be understood that any bevel of the upper, radially outermost portion of the band that positions the edge of the band at a position away from the pulley wall to thereby provide a dirt or metal accumulation space, is satisfactory. For example, the radially outermost edges of the band may be beveled approximately reversely to the bevels at 11b, 12b, 13b and 14b.

The embodiment illustrated in FIGURE 2 is further shown in FIGURES 3 and 4 where the band is shown in its extended, uncurled, condition. As may there be seen, the edge on the underside of the band, opposite from the key 11a is provided with a bevel throughout its length. On the other hand, a form of the embodiment in which the uppermost surface is reversely beveled, may be seen in FIGURES 6; a cross-section of a belt 110 as thus modified is shown beveled at 110b and 110c.

Manufacture of the band may be accomplished in various ways. In the arrangement shown in FIGURES 3, 4 and 5, the band, prior to curling and spring tempering, is coined. In this operation, the side edges of the band are left a few thousandths of an inch narrower than the final desired dimension and are parallel to the walls 21 of a coining die 20. A coining pressure blade 22 is then moved downwardly under heavy pressure forcing the metal in the corners 11d of the band to flow inwardly of the band edge and simultaneously causing the lower edge 11e of the band to squeeze laterally outwardly against the wall 21. The resulting band edge comprises a dense metal coined edge having the configuration shown in the cross-section of FIGURE 2.

Alternatively, the bands may be provided with a complete initial bevel conforming to the walls of the pulley with which they are to be used and the metal at the upper edge may be removed by a grinder or similar beveling means. For example, the cross-section shown in FIGURE 6 may readily be accomplished in this manner.

It has been found, as above noted, that upon provision of the bands with the radially outwardly formed relief no band ineffectuality is encountered. Further, by providing the dual bevel band edge prior to curling and tempering the bands, the proper curl and temper may be provided the band in a manner ensuring exactly the proper amount of spring tension on the band when in its assembled condition and independent of any wearing that may subsequently be encountered. If, for example, a parallel edged band were initially employed and it were left slightly soft to permit a wearing in action, by the time the band properly seated over a substantial portion of its wedging edges, the band would have sunk into the pulley groove a very substantial distance, affecting the spring tension of the clutch adversely. By providing the proper bevel at the time of construction and curling of the bands, exactly the proper spring tension may be built into the band and will be immediately effective without any wearing in. Additionally, the bands may be of sufficiently hard material as to substantially prevent wear while still providing completely satisfactory band seating.

From the above it will be seen that I have provided a novel and substantially improved band configuration for an over-lapping band-type friction device. While the device is shown in a clutch using four bands, it will be readily observed that this technique has similar merit for utilization in any clutch having a plurality of bands or, alternatively, in a clutch having a single band which is sufficiently long to overlap itself around the pulley.

It will be further apparent that modifications and variations may be made in the band configuration as described, without departing from the scope of the novel concepts of the present invention. For example, the proportions of the beveled wedge surface to total band thickness may be varied. As shown, approximately two-thirds of the band is beveled for pulley contact, a ratio that has been found particularly effective. It is, accordingly, my intention that the scope of the invention be limited solely by that of the hereinafter appended claims.

I claim as my invention:

1. A band for one-way V-pulley friction devices comprising an elongated thin spring metal strip, precurved into a generally flat radial spiral shape tapered in width along its length from adjacent its outer end to its inner end to provide a pair of progressively closer side edges for progressively deeper co-operation with the sidewalls of a V-pulley, securing means on the strip adjacent its outer end, said side edges being beveled at their radially innermost corners to conform to said V-pulley and being relieved at their outermost corners.

2. A band for one-way V-pulley friction devices comprising an elongated thin spring metal strip, precurved into a generally flat radial spiral shape tapered in width along its length from adjacent its outer end to its inner end to provide a pair of progressively closer side edges for progressively deeper co-operation with the sidewalls of a V-pulley, securing means on said strip adjacent its outer end, said side edges being beleveled at their radially innermost corners to conform to said V-pulley and being relieved at their outermost corners throughout the overlap length of the band.

3. A friction device comprising a first member having an externally facing peripheral V-groove therein, a second member having at least one internally facing pocket positioned adjacent and over said groove, a torque-transmitting band associated with each pocket and having a body curved to wrappingly engage the sidewalls of said V-groove, and means securing one end of each said band in a respective pocket, each said band comprising an elongated thin spring metal strip, precurved into a generally flat radial spiral shape tapered in width along its length from adjacent its outer end to its inner end to provide a pair of progressively closer side edges for progressively deeper co-operation with the sidewalls of a V-pulley, securing means on the strip adjacent its outer end on the radially outer side thereof, said side edges being beveled at their radially innermost corners to conform to said V-pulley and being relieved at their outermost corners.

4. A friction device comprising a first member having an externally facing peripheral V-groove therein, a second member having at least one internally facing pocket positioned adjacent and over said groove, a torque-transmitting band associated with each pocket and having a body curved to wrappingly engage the sidewalls of said V-groove, and means securing one end of each said band in a respective pocket, each said band comprising an elongated thin spring metal strip, precurved into a generally flat radial spiral shape tapered in width along its length from adjacent its outer end to its inner end of provide a pair of progressively closer side edges for progressively deeper co-operation with the sidewalls of a V-pulley, securing means on the strip adjacent its outer end on the radially outer side thereof, said side edges being beveled at their radially inner corners to conform to said V-pulley and being relieved at their outermost corners throughout the overlap length of the band.

5. A band for one-way V-pulley friction devices comprising an elongated thin spring metal strip, precurved into a generally flat radial spiral shape tapered in width along its length from adjacent its outer end to its inner end to provide a pair of progressively closer side edges for progressively deeper co-operation with the sidewalls of a V-pulley, securing means on the strip adjacent its outer end, said side edges being coined to provide a bevel at their radially innermost corners only to conform to said V-pulley.

6. A band for one-way V-pulley friction devices comprising an elongated thin spring metal strip, precurved into a generally flat radial spiral shape tapered in width along its length from adjacent its outer end to its inner end to provide a pair of progressively closer side edges for progressively deeper co-operation with the sidewalls of a V-pulley, securing means on the strip adjacent its outer end, said side edges being coined to provide a bevel at their radially innermost corners only approximately two-thirds of the thickness of the band to conform to said V-pulley at the coined area and to provide relief from contact with the V-pulley at the remaining one-third area of the band.

References Cited by the Examiner
UNITED STATES PATENTS 3,012,637  12/1961  Dodwell _____ 188—82.6
3,117,660  1/1964  Dodwell _____ 192—41

FRANK SUSKO, *Primary Examiner.*

DON A. WAITE, *Examiner.*

A. T. McKEON, *Assistant Examiner.*